United States Patent
Hermann et al.

(10) Patent No.: US 12,276,032 B2
(45) Date of Patent: Apr. 15, 2025

(54) METHOD FOR TREATING A PART MADE OF FERROUS METAL, AND PART MADE OF FERROUS METAL

(71) Applicant: HYDROMECANIQUE ET FROTTEMENT, Andrezieux-Boutheon (FR)

(72) Inventors: Luc Hermann, Lyons (FR); Vincent Monteux, La Talaudiere (FR)

(73) Assignee: HYDROMECANIQUE ET FROTTEMENT, Andrezieux-Boutheon (FR)

( * ) Notice: Subject to any disclaimer, the term of this patent is extended or adjusted under 35 U.S.C. 154(b) by 532 days.

(21) Appl. No.: 17/783,544

(22) PCT Filed: Dec. 23, 2020

(86) PCT No.: PCT/FR2020/052620
§ 371 (c)(1),
(2) Date: Jun. 8, 2022

(87) PCT Pub. No.: WO2021/130460
PCT Pub. Date: Jul. 1, 2021

(65) Prior Publication Data
US 2023/0029324 A1    Jan. 26, 2023

(30) Foreign Application Priority Data
Dec. 24, 2019 (FR) ........................ 1915524

(51) Int. Cl.
*C23C 8/80* (2006.01)
*C23C 8/26* (2006.01)

(52) U.S. Cl.
CPC . *C23C 8/80* (2013.01); *C23C 8/26* (2013.01)

(58) Field of Classification Search
CPC .................................. C23C 8/80; C23C 8/26
See application file for complete search history.

(56) References Cited

U.S. PATENT DOCUMENTS

| 2005/0039825 A1 | 2/2005 | Schuster |
| 2012/0118434 A1 | 5/2012 | Konishi et al. |
| 2017/0349997 A1 | 12/2017 | Magdinier et al. |

FOREIGN PATENT DOCUMENTS

| EP | 2460906 A1 | 6/2012 |
| FR | 2991341 A1 | 12/2013 |
| FR | 2991694 A1 | 12/2013 |
| FR | 3030578 A1 | 6/2016 |
| JP | 2011032514 A | 2/2011 |
| JP | 2011208250 A | 10/2011 |
| JP | 2012062494 A | 3/2012 |
| JP | 2018502220 A | 1/2018 |
| WO | WO-2011/013362 A1 | 2/2011 |
| WO | WO-2016/102813 A1 | 6/2016 |

OTHER PUBLICATIONS

International Search Report issued in PCT Patent Application No. PCT/FR2020/052620 mailed on Mar. 16, 2021.

*Primary Examiner* — Jessee R Roe
(74) *Attorney, Agent, or Firm* — MARSHALL, GERSTEIN & BORUN LLP

(57) ABSTRACT

A method for treating a part made of ferrous metal includes a nitriding operation forming on the part a combination layer having a thickness of between 5 and 30 μm, and a diffusion region, arranged beneath and in contact with the combination layer, having a thickness of between 100 μm and 500 μm. The method also includes an operation of quenching the part by high-frequency induction, over an induction depth that is greater than or equal to 0.5 mm, thereby hardening the part. The resulting part has a surface hardness greater than or equal to 50 HRC, a hardness of the combination layer greater than or equal to 400 HV0.05, and a hardness of the part greater than or equal to 500 HV0.05 at a depth of 500 μm. The high-frequency induction quenching operation is performed without the application of a protective film on the part prior to the induction quenching operation.

16 Claims, 8 Drawing Sheets

|  |  | E1 | E2 | E3 | E4 | E5 | E6 | E7 | E8 | E9 | E10 | E11 | E12 | E13 |
|---|---|---|---|---|---|---|---|---|---|---|---|---|---|---|
|  | Essais Acier | \multicolumn{10}{c}{C45} | C10 | C10 | C70 | 42CD4 |
| Paramètres | Fréquence (kHz) | 10 | 100 | 100 | 100 | 100 | 50 | 400 | 50 | 400 | 100 | 100 | 100 | 100 |
| | Puissance (kW) | 300 | 100 | 100 | 100 | 100 | 100 | 100 | 100 | 100 | 100 | 100 | 100 | 100 |
| | Vitesse de défilement (mm/min) | 1250 | 1250 | 1400 | 1300 | 1000 | 1250 | 1250 | 1100 | 1100 | 1000 | 1250 | 1250 | 1100 |
| | Vitesse de défilement (mm/s) | 21 | 21 | 23 | 22 | 17 | 21 | 21 | 18 | 18 | 17 | 21 | 21 | 18 |
| | Inverse de la vitesse de défilement (s/mm) | 0.048 | 0.048 | 0.043 | 0.046 | 0.060 | 0.048 | 0.048 | 0.055 | 0.055 | 0.060 | 0.048 | 0.048 | 0.055 |
| | Énergie E (Pcs) en Joule (W.s) par mm | 14.4 | 4.8 | 4.3 | 4.6 | 6.0 | 4.8 | 4.8 | 5.5 | 5.5 | 6.0 | 4.8 | 4.8 | 5.5 |
| Résultats | Dureté couche de combinaison après induction | NOK | OK | OK | OK | NOK | OK | OK | OK | OK | NOK | OK | OK | OK |
| | Dureté couche de combinaison après induction (HV0.05) | 300 | 600 | 600 | 600 | 300 | 600 | 600 | 600 | 600 | 300 | 400 | 800 | 800 |
| | Profondeur d'induction (mm) | 2.9 | 0.6 | 0.45 | 0.5 | 0.65 | 0.6 | 0.6 | 0.6 | 0.6 | 0.7 | 0.5 | 0.65 | 0.55 |
| | Dureté de surface (HRC) | 60 | 60 | 45 | 50 | 60 | 60 | 60 | 60 | 60 | 55 | 55 | 65 | 62 |
| | Tenue en corrosion BS (h) | 24 | 120 | 120 | 120 | 24 | 96 | 144 | 120 | 144 | 24 | 96 | 120 | 120 |
| | HV à coeur | 250 | 250 | 250 | 250 | 250 | 250 | 250 | 250 | 250 | 200 | 200 | 300 | 280 |
| | HV ≥ HV+100 à 0.5mm de profondeur | 775 | 750 | 250 | 350 | 750 | 750 | 750 | 750 | 750 | 650 | 325 | 775 | 500 |
| | HV ≥ HV+350 à 0.25mm de profondeur | 825 | 800 | 750 | 800 | 800 | 800 | 800 | 800 | 800 | 700 | 700 | 875 | 900 |

FIGURE 2

METHOD FOR TREATING A PART MADE OF FERROUS METAL, AND PART MADE OF FERROUS METAL

TECHNICAL FIELD

The field of the invention is that of the surface treatment of parts made of ferrous metal, in particular made of very low-alloy steel or low-alloy steel.

BACKGROUND

In automotive, aeronautical or industrial applications, mechanical parts are generally subjected to considerable stresses during service life.

Conventionally, the parts may receive one or more treatments to improve some of their performances, including friction properties, wear resistance, fatigue resistance, scaling resistance, corrosion resistance, etc.

However, it is difficult to obtain a good compromise between the different properties of the part.

By way of example, document WO2011013362A1 describes a method of treating a part, comprising a nitriding operation, a coating operation by a chemical conversion film (sol-gel), and an induction quenching operation. However, such a method has a prohibitive cost, because of the cost of the film and the need to perform three successive operations.

SUMMARY OF THE DISCLOSURE

The aim of the present invention is to remedy the drawbacks mentioned above, while maintaining a good compromise between the various properties of the part.

To this end, the object of the invention is a method of treating a part made of ferrous metal, comprising:
a nitriding operation forming on the part a combination layer having a thickness of between 5 and 30 µm, and a diffusion region, arranged beneath and in contact with the combination layer, having a thickness of between 100 µm and 500 µm; then an operation of quenching the part by high-frequency induction, over an induction depth that is greater than or equal to 0.5 mm, thereby hardening the part and lending said part:
    a surface hardness greater than or equal to 50 HRC,
    a hardness of the combination layer greater than or equal to 400 HV0.05,
    a hardness of the part greater than or equal to 500 HV0.05 at a depth of 500 µm,
and wherein the high-frequency induction quenching operation is performed without the application of a protective film on the part prior to the induction quenching operation.

The method of the invention makes it possible to obtain a part having significant resistance to wear by abrasion and adhesion, improved friction properties and resistance to scaling, and good corrosion resistance. The method of the invention is also simpler to implement and less expensive than the methods of the prior art because it saves having to arrange a protective film for the combination layer, as well as possible having to remove said protective film.

The protective film may be of any type suitable for preventing degradation of the combination layer during high-frequency induction quenching, this degradation possibly may be manifested by scaling, cracking or fracturing the combination layer.

In particular, the protective film may be a sol-gel film. Consequently, the high-frequency induction quenching operation is performed without a sol-gel film.

According to other aspects, the treatment method according to the invention has the following different characteristics taken individually or according to their technically possible combinations:
the nitriding operation is performed with gas, or by plasma, or by molten salts;
the nitriding operation is performed at a temperature of between 500° C. and 630° C. for a duration of between 15 minutes and 3 hours;
the induction quenching operation is not followed by a tempering operation;
the operation of quenching the part by high-frequency induction is performed in such a way that ferrite is conserved in the part between the diffusion region/combination layer interface and at a depth of 500 µm, preferably between the diffusion region/combination layer interface and at a depth of 300 µm. The diffusion region/combination layer interface means the contact surface between the diffusion region and the overlying combination layer. The quenching is quick and does not completely transform the ferrite of the martensite part over its treatment depth, such that ferrite remains on the depth treated by HF quenching at the end of the process. The depth of 500 µm corresponds to an induction depth at which hardening and/or changes in the metallurgical structure of the part are observed;
the operation of quenching the part by high-frequency induction is performed in such a way as to have a residual ferrite content in the part, between the diffusion region/combination layer interface and at a depth of 500 µm, of between 1% and 50% by volume, preferably between 1% and 30%, and more preferably between 5% and 30%. The residual ferrite content is by volume, and corresponds to the ratio of the volume of ferrite to the volume of the remainder of the part in the zone considered;
the operation of quenching the part by high-frequency induction is performed in such a way as to have a residual ferrite content in the part, between the diffusion region/combination layer interface and a depth of 500 µm, of between 5% and 20% by volume, preferably between 5% and 15%;
the method comprises an impregnation step subsequent to the high-frequency induction quenching operation. If a tempering step is performed, impregnation is performed after tempering. It may be performed, for example, by dipping or spraying. The impregnation protects the part because it may delay the start of corrosion, reduce the corrosion rate and thus increase the service life of the part;
the method provides the part with a corrosion resistance that is greater than 80 h, according to a neutral saline spray test. corrosion resistance is measured according to a test using a neutral saline spray, sometimes also called a standard saline spray test, in accordance with the standard EN ISO 9227;
the high-frequency induction quenching operation is performed with the following parameters:
    a frequency of between 50 and 400 kHz,
    a linear energy of between 4.6 and 5.8 J/mm.
        This double condition on the frequency and the linear energy makes it possible to obtain a part made of ferrous metal, the mechanical properties of which are greatly improved relative to the parts of the prior art, in particular, resistance to wear by abrasion and adhesion, resistance to friction, resistance to scaling, while maintaining good corrosion resistance. The frequency and the linear energy are adjusted according to the morphology of the part, for example its diameter;

the high-frequency induction quenching operation is performed at a speed of travel of between 5 mm/s and 40 mm/s.

The invention also relates to a part made of ferrous metal, comprising a combination layer having a thickness of between 5 μm and 30 μm, and a diffusion region, arranged beneath and in contact with the combination layer, having a thickness of between 100 μm and 500 μm, said part having:

a surface hardness greater than or equal to 50 HRC, a hardness of the combination layer greater than or equal to 400 HV0.05, a hardness of the part greater than or equal to 500 HV0.05 at a depth of 500 μm, said part comprising ferrite and martensite between the diffusion region/combination layer interface and at a depth of 500 μm.

According to other aspects, the part made of ferrous metal according to the invention has the following different characteristics taken individually or according to their technically possible combinations:

the hardness of the part at a depth of 0.5 mm is greater than or equal to a core hardness of +100 HV0.05;

the hardness of the part at a depth of 0.25 mm is greater than or equal to a core hardness of +350 HV0.05;

the part is made of very low-alloy steel, of the C10-C70 family, having a manganese content less than 1%. Under these conditions, the steel has no appreciable addition element, i.e., an element which would exceed 5% by mass relative to the total mass of the steel. Preferably, the part should be made of C45 grade steel. The term "grade", commonly used in the field of steels, designates a specific type of steel in a family. In particular, here, it refers to grade C45 selected from the family of steels C10 to C70;

the part is made of low-alloy steel, with no addition element exceeding 5% by mass. More preferably, the part is made of 31CrMo4 grade steel;

the part comprises ferrite and martensite between the diffusion region/combination layer interface and at a depth of 300 μm;

the part comprises a ferrite content, between the diffusion region/combination layer interface and a depth of 500 μm, of between 1% and 50% by volume, preferably between 1% and 30%, and more preferably between 5% and 30%;

the part comprises a ferrite content, between the diffusion region/combination layer interface and a at depth of 500 μm, of between 5% and 20% by volume, preferably between 5% and 15%;

the part has a corrosion resistance that is greater than 80 h, according to a test using a neutral saline spray.

In the present text, the term "thickness" means the distance between the upper limit and the lower limit of a given layer or zone within the part made of ferrous metal. The thickness is perpendicular to the average area of said upper and lower limits.

The term "depth" designates the distance between the surface of the part, also called the free surface, and is a given point within the part. The depth is perpendicular to the mean surface of the free surface. For example, "a hardness of the diffusion region greater than or equal to 500 HV0.05 at a depth of 500 μm" means that at a distance of 500 μm within the part, counted from the free surface of the part, the hardness of the diffusion region is greater than or equal to 500 HV0.05.

The terms such as "on", "on top of", "above" and "beneath", "below", "under", "underneath" refer to the positions of the layers or zones relative to each other within the part. These terms do not necessarily imply that there is contact between the layers or zones that are being considered.

In a known manner per se, nitriding consists in immersing a part made of ferrous metal into a medium capable of yielding nitrogen. In the present text, nitriding includes nitrocarbonisation, which is a variant of nitriding, in which carbon enters the part in addition to nitrogen. The ARCOR process described in the remainder of the present text is a preferred example of a nitrocarbonisation process.

Within the treated part, the diffusion region is arranged beneath the combination layer and extends towards the core of the part (moving away from the free surface) from said combination layer. On the other hand, the combination layer may be on the surface of the part or at a certain depth.

An induction depth greater than or equal to 0.5 mm means that the hardening and/or the changes in the metallurgical structure of the part, caused by the induction quenching step, extend from the surface of the part to a depth of at least 0.5 mm. After a certain depth, the thermal effect gradually attenuates until it no longer has a measurable effect on the microstructure and the hardness of the part.

The high-frequency induction quenching operation provides a hardness of the part greater than or equal to 500 HV0.05 at a depth of 500 μm, and preferably a corrosion resistance greater than 80 hours in a standard saline spray test.

In fact, surprisingly, high-frequency induction quenching according to the invention makes it possible to reinforce the mechanical characteristics, in particular the hardness, of the part previously nitrided, while preserving the combination layer. Thus, the corrosion resistance of the parts is preserved without having to use an additional device such as, for example, a sol-gel film or a paint. The processing costs can be reduced by not using a sol-gel film.

BRIEF DESCRIPTION OF THE DRAWINGS

The invention will be better understood from the following description which is given solely by way of non-limiting example and is made in reference to the appended drawings, wherein:

FIG. 2 is a table describing a series of tests performed on steel parts, in order to characterise the method according to the invention.

The combination layer 2 offers, among other things, good friction properties, a high level of resistance to adhesive wear and good corrosion resistance.

The diffusion region 3 offers a hardness gradient, between the combination layer 2 and the base material 1 situated beneath the diffusion region 3, favourable to a certain level of wear resistance (abrasive and adhesive) and a level of fatigue resistance.

TABLE 1 below describes different test series:

| Series | 1 | 2 | 3 | 4 | 5 |
|---|---|---|---|---|---|
| Type | ARCOR solely | Conventional HF quenching solely | Conventional HF quenching then ARCOR | ARCOR then conventional HF quenching | ARCOR then HF FLASH quenching = ARCOR FLASH in accordance with the invention |
| Abrasive wear | + | +++ | + | +++ | +++ |
| Adhesive wear | +++ | 0 | +++ | 0 | +++ |
| Fatigue | + | +++ | + | +++ | +++ |
| Friction property | +++ | 0 | +++ | 0 | +++ |
| Corrosion resistance | +++ | 0 | +++ | 0 | ++ |
| Anti-scaling | +++ | +++ | +++ | − | +++ |

Figure 11:

Legend:
0: property does not exist
+: moderate improvement of the property
++: good property
+++: excellent property
−: degraded property FIG. 11 is a photograph of a part made of ferrous metal that has undergone a single ARCOR treatment.

Figure 12:
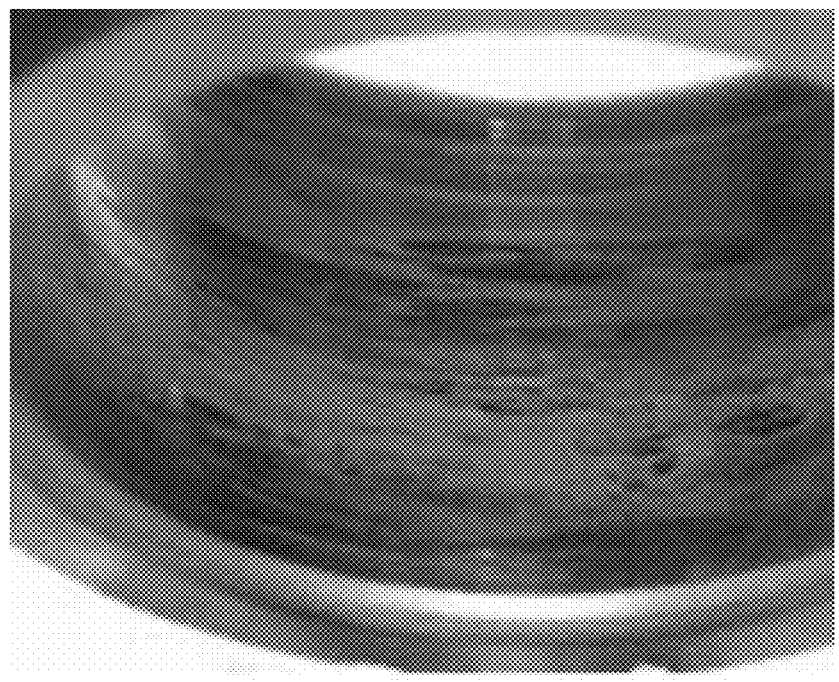

FIG. 12 is a photograph of a part made of ferrous metal according to the invention, having undergone an ARCOR FLASH treatment (ARCOR nitriding followed by high-frequency induction quenching).

Figure 4:
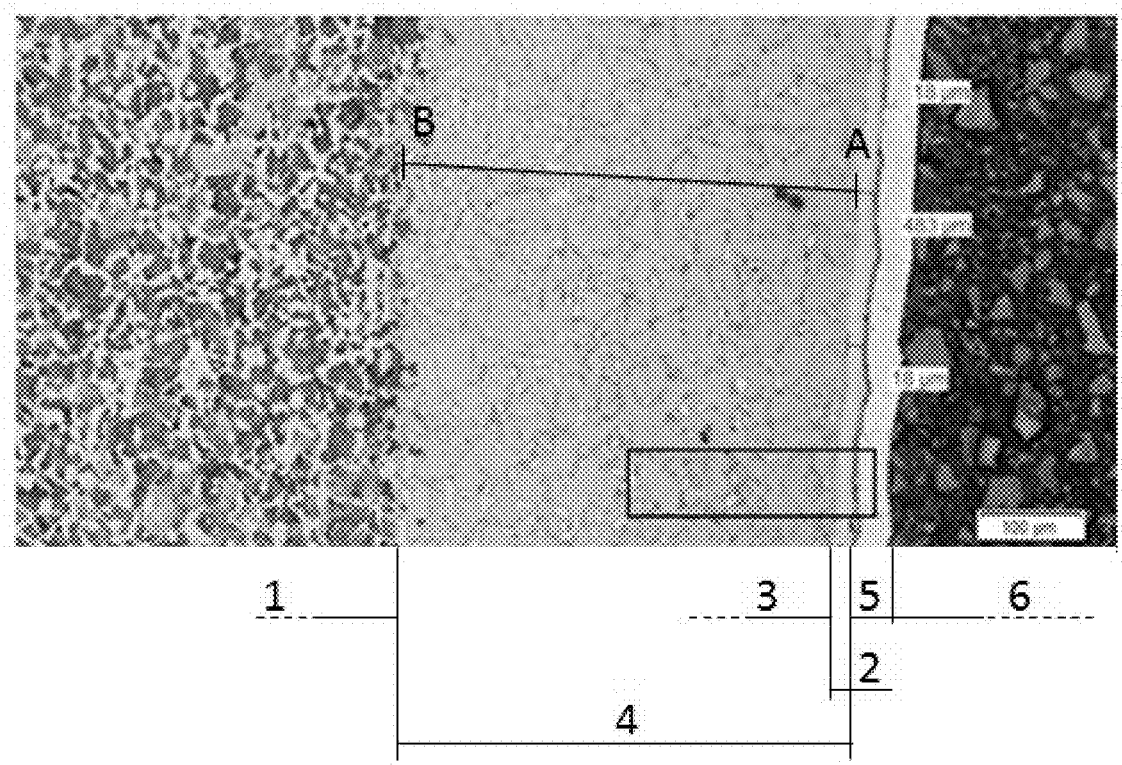
FIG. 4 is a micrograph of a part treated by the method according to the invention.
Figure 13:
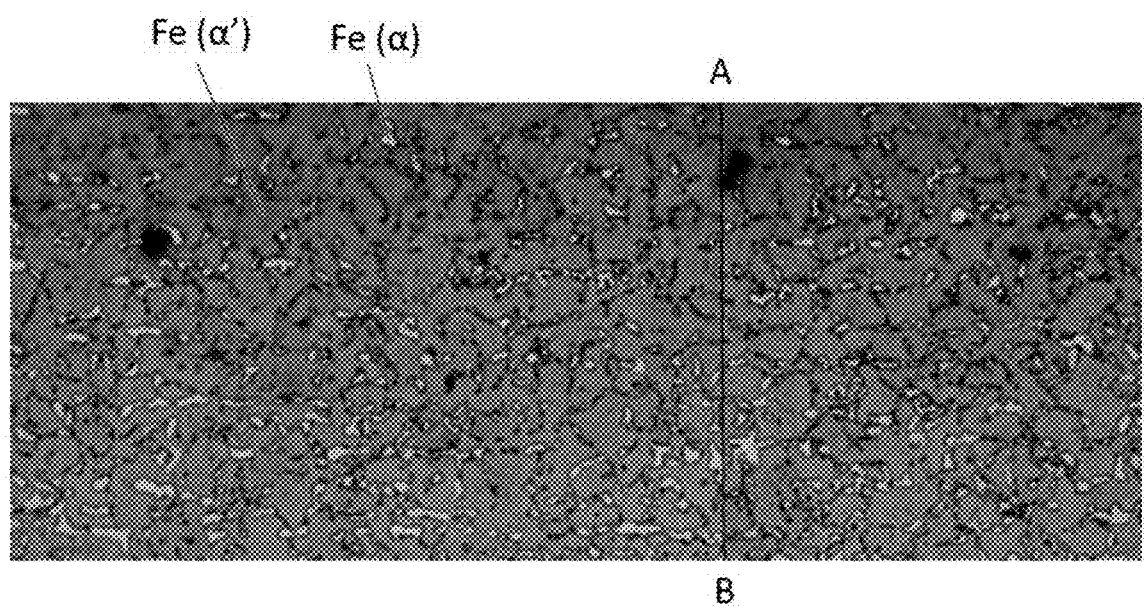

FIG. 13 is a close-up view of the micrograph in FIG. 4, centred on the induction layer.

DETAILED DESCRIPTION

The aim of the inventors' approach was to perform several series of tests implementing different treatments of a part made of ferrous metal.

In particular, the inventors have studied the effects of the following two treatments.

The ARCOR nitrocarbonisation treatment (trademark registered by the Applicant) provides, from the surface towards the core of the part, a juxtaposed combination layer 2 and diffusion region 3 (see FIG. 4). Combination layer 2 typically has a thickness of approximately 20 µm, whereas diffusion region 3 typically has a thickness of a few tens or hundreds of micrometres, for example 300 µm.

High-frequency quenching (frequency≥20 kHz) provides a martensitic structure on the surface of the part, on an induction layer generally having a depth of approximately 1 mm. In other words, hardening by induction extends from the surface of the part to a depth of approximately 1 mm, and is superimposed on the hardening profile already obtained by nitriding. The induction layer comprises Fe(α') martensite resulting from the transformation of the Fe(α) ferrite, as well as the remaining untransformed Fe(α) ferrite, and offers a high level of hardness, accepted as being very favourable to the resistance to abrasive wear and to fatigue.

Comments regarding the results of the test series:

Series 1: Low sub-layer hardness depth (≈0.3 mm), therefore moderate resistance to abrasive wear and fatigue.

Series 2: Absence of any anti-seize property and corrosion resistance.

Series 3: The ARCOR nitriding temperature (≈590° C.) has a tempering effect on the martensitic structure brought about by HF quenching. This results in a significant decrease in hardness. The results are comparable to those of Series 1.

Series 4: The time/temperature parameter of HF quenching degrades the ARCOR combination layer. The corrosion resistance properties and tribological behaviour are therefore degraded.

Series 5: Surprisingly, FLASH HF quenching makes it possible to minimise or even eliminate degradation of the combination layer 2 of the ARCOR (oxidation or scaling which induce the loss of corrosion resistance properties and the tribological properties associated with the combination layer 2). Compared with Series 4, part P retains its basic properties provided by the ARCOR. Compared with Series 1, HF FLASH quenching increases the hardness below the combination layer 2, as well as the hardening depth.

The development of the invention required, firstly, identifying the unexpected advantages of FLASH HF quenching compared with conventional HF quenching, then, secondly, characterising the parameters of FLASH HF quenching in order to be able to implement the ARCOR+FLASH HF quenching treatment method=ARCOR FLASH on all types of ferrous parts.

Figure 1:
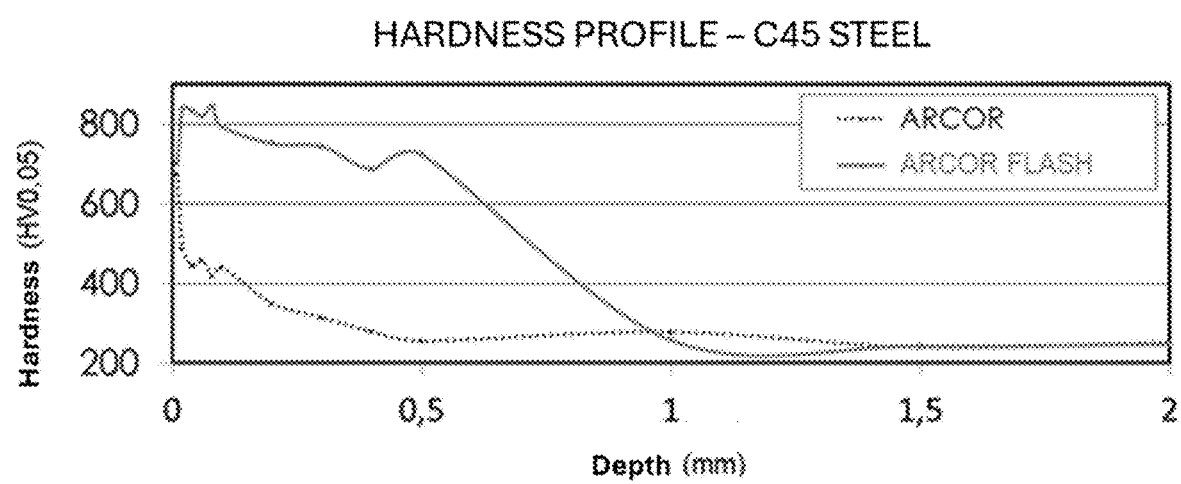
FIG. 1 is a graph illustrating the hardness profile of two parts, respectively compliant (ARCOR FLASH, i.e., ARCOR nitriding treatment followed by high-frequency induction quenching) and not in accordance with the invention (ARCOR single, without high-frequency induction quenching).

FIG. 1 is a graph comparing the hardness profile of two parts, including a part receiving a single ARCOR treatment (Series 1) and a part receiving an ARCOR FLASH treatment in accordance with the invention (Series 5). The ARCOR FLASH treatment makes it possible to increase the hardness below the combination layer 2 (in particular in the diffusion region), as well as the hardening depth. In terms of the sample of FIG. 1, the diffusion region 3 has a thickness of between 400 µm and 500 µm, and the induction depth is approximately 1 mm.

FIG. 2 is a table describing a series of tests performed on steel parts, in order to characterise the ARCOR FLASH treatment method in accordance with the invention.

The parts are steel bars with a diameter of 38 mm, having received an ARCOR treatment creating a combination layer with a thickness of between 15 µm and 20 µm.

The E1-E9 tests are performed on C45 steel bars, the E10 and E11 tests on C10 steel bars, the E12 test on a C70 steel bar, and the E13 test on a 42CD4 steel bar.

The tests consist of high-frequency induction quenching operations, performed with variable parameters. The speed of travel is that of the magnetic inductor which is movable in translation along the part.

Comments regarding the test results:
E1 (comparative): Low frequency and high power. Combination layer degraded by induction.
E2 (in accordance with the invention): Optimum linear energy. Satisfactory results.
E3 (comparative): Speed of travel slightly too fast. Linear energy a little too low. Surface hardness and induction depth too low.
E4 (in accordance with the invention): Results not as good as E2 but better than E3.
E5 (comparative): Speed of travel slightly too slow. Linear energy a little too high. Satisfactory surface hardness and induction depth, but combination layer degraded due to induction.
E6, E7, E8 and E9 (all according to the invention): Tests intended to determine the influence of the frequency and speed of travel. Satisfactory results.
E10, E11 and E12: Tests illustrating the influence of steel grade on the treatment results.
E10 (comparative): The parameters of test E5, tested on C10 steel, produce a non-compliant result.
E11 (in accordance with the invention): The parameters of the E2 test, tested on C10 steel, make it possible to obtain satisfactory results.
E12 (in accordance with the invention): The parameters of the E2 test also make it possible to obtain satisfactory results when testing on C70 steel.
E13 (in accordance with the invention): The parameters of the E8 test, applied to 42CD4 steel, make it possible to obtain satisfactory results.

Figure 3:
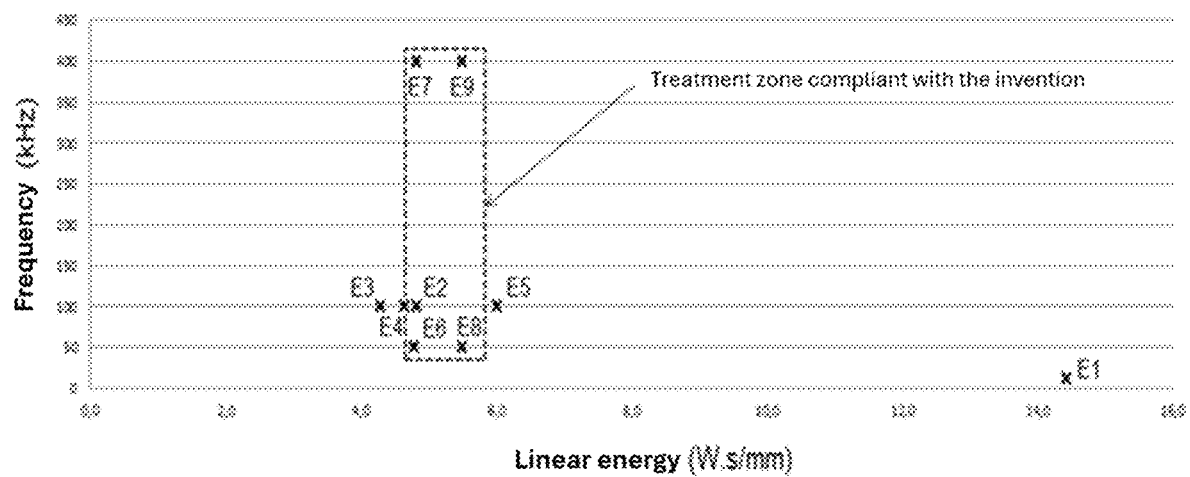
FIG. 3 is a graph illustrating a series of tests corresponding to the table in FIG. 2.

FIG. 3 is a graph showing the results of E1-E9 tests in FIG. 2, performed on C45 steel bars.

On the graph, the linear energy (in W·s/mm) is represented on the x-axes and the induction frequency (in kHz) is represented on the y-axes.

The linear energy is defined as the power of the induction reduced to the speed of travel of the parts P during induction. This parameter is linked to the geometry of the parts P processed. Another more general parameter could be the density of power per unit area applied for a certain period of time, i.e., the power of the induction divided by the area of the part absorbing the induction and divided by the speed of travel. It would thus be possible, on the basis of optimum quenching parameters for a part of a first dimension, to easily find the optimum quenching parameters for a part of a second dimension (for example, of a larger diameter), the other parameters being otherwise equal (same material, same nitridation).

From FIGS. 2 and 3, it can be seen that the tests performed on C45, C10, C70 and 42CD4 steel, for which the frequency (F) is between 50 kHz and 400 kHz and the linear energy (E) is between 4.6 J/mm and 5.8 J/mm (one is thus in the zone modelled by the dotted rectangle in FIG. 3), making it possible to obtain after induction:
a combination layer of satisfactory quality,
a combination layer which has a hardness greater than or equal to 400 HV0.05,
an induction depth greater than or equal to 0.5 mm,
a surface hardness greater than or equal to 50 HRC,
and satisfactory corrosion resistance.

In addition, these results are obtained without having to firstly coat the part in a protective film before high-frequency induction quenching, such as a sol-gel film, which makes it possible to reduce the complexity and the costs of the treatment.

For tests 2, 4, 6 to 9 and 11 to 12, all in accordance with the invention, the following advantageous properties are present:
the hardness of the diffusion region at a depth of 0.25 mm is greater than or equal to a core hardness of +350 HV0.05, and
the hardness of the diffusion region at a depth of 0.5 mm is greater than or equal to the core hardness of +100 HV0.05.

The treatment in accordance with the invention is therefore effective down to great depths within the diffusion region.

These tests have been performed on C45, C10, C70 and 42CD4 steel bars. In practice, the frequency (F) and the linear energy (E) of the high-frequency induction quenching are adapted to the ferrous metal of the part P. It may be necessary to proceed by means of tests in order to determine the appropriate parameters.

To produce the micrographs of the metal parts illustrated in FIGS. 4 to 8, and described below, the parts have been subjected to chemical etching by a solution of nitric acid and alcohol called "Nital". Nital thus plays the role of indicator of the microstructure of the part, and makes the latter visible to the optical microscope.

Figure 5:
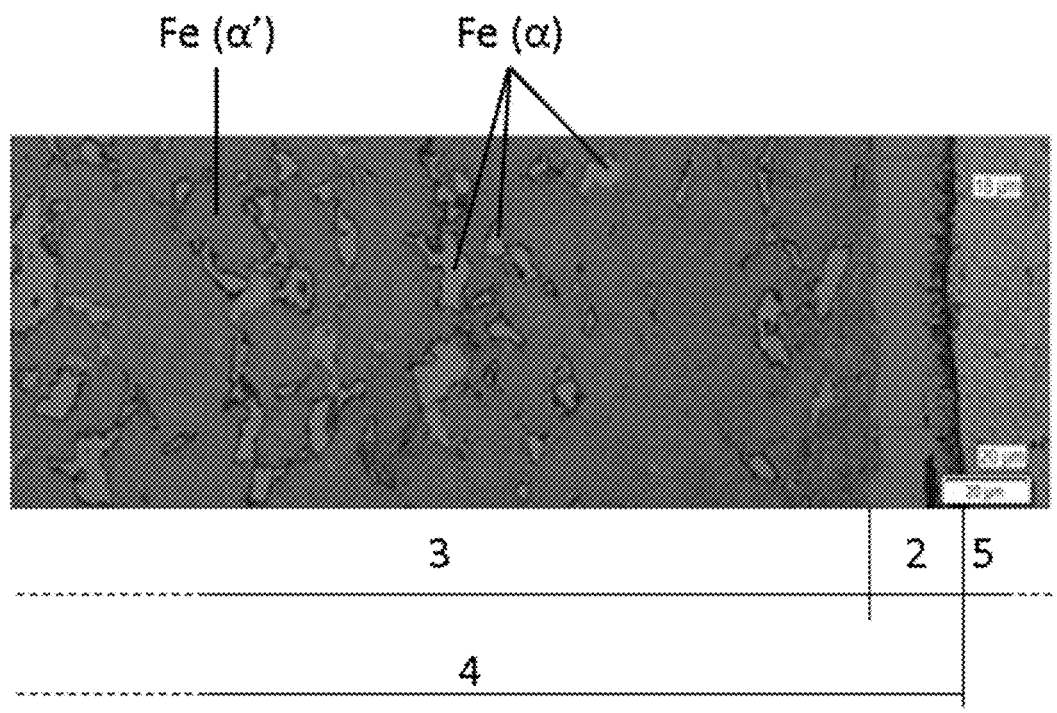
FIG. 5 is a close-up view of FIG. 4.

FIGS. 4 and 5 are micrographs of a part P made of C45 steel which has received the ARCOR FLASH treatment (ARCOR+HF induction quenching, according to the invention) with a combination layer 2 µm of 18 µm, a diffusion region 3 of approximately 300 µm and an induction depth of approximately 0.5 mm.

Part P comprises a steel substrate 1, an induction layer 4, a combination layer 2 and a diffusion region 3. A sheet of aluminium 5 and a coating 6 have been added in order to make the cut necessary for performing the micrograph. In FIG. 4, the segment [AB] represents the distance (thickness) between an average surface of the combination layer 2 (interface between the diffusion region 3 and the combination layer 2), and an average surface of the steel substrate 1.

Here, the combination layer 2 and the diffusion region 3 obtained by ARCOR NITROCARBONISATION.

The induction layer 4 is obtained by high-frequency induction. It is composed of fine martensite Fe($\alpha'$) and ferrite Fe($\alpha$). FIG. 5 clearly shows the presence of Fe($\alpha$) ferrite remaining in the quenching zone of the part obtained at the end of the process, after quenching. It is a microstructure that is in accordance with the invention.

Figure 6:
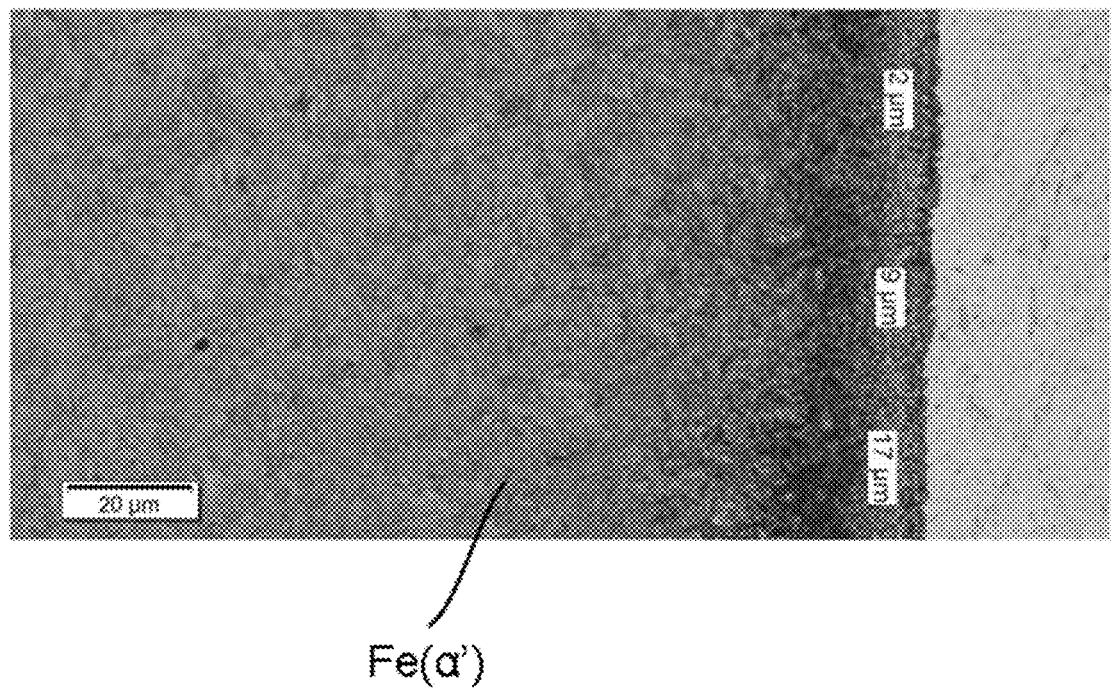
FIG. 6 is a micrograph of a part treated according to the prior art (ARCOR treatment followed by induction quenching according to the prior art).

FIG. 6 illustrates a micrograph of nitrided steel that has then received conventional HF quenching: all the Fe(α) ferrite has been transformed into Fe(α') martensite during quenching. Therefore, there is no longer any ferrite in the treated zone. This microstructure is therefore not in accordance with the invention.

Figure 7:
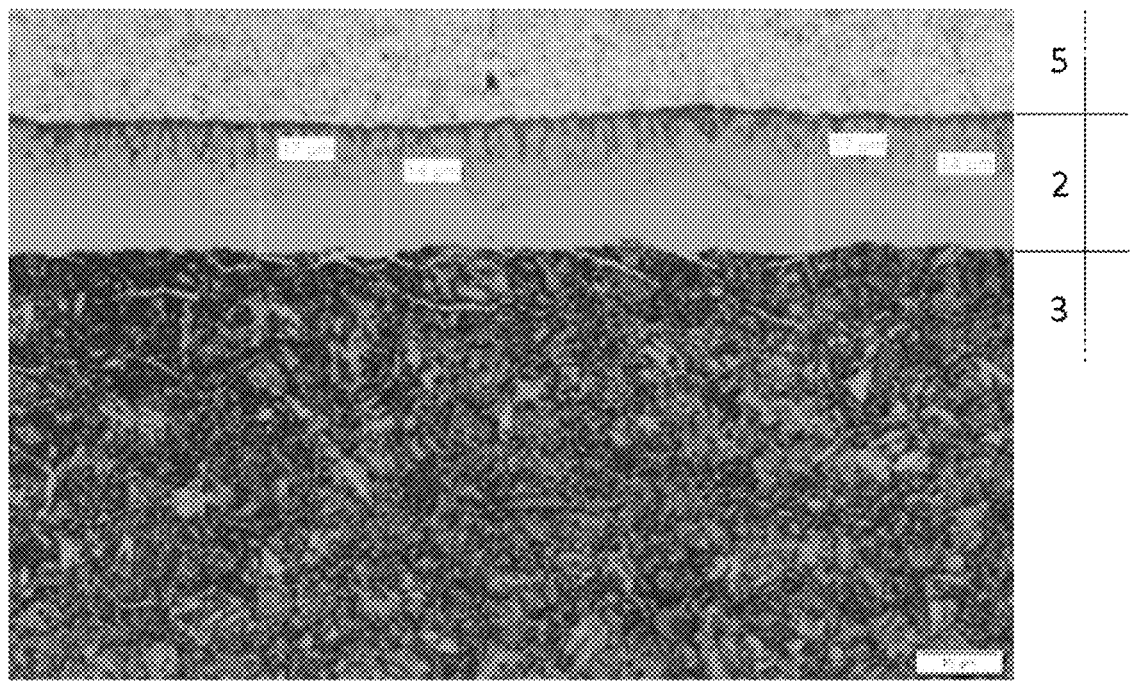
FIG. 7 is a micrograph of a part treated after ARCOR treatment, without induction quenching.
Figure 8:
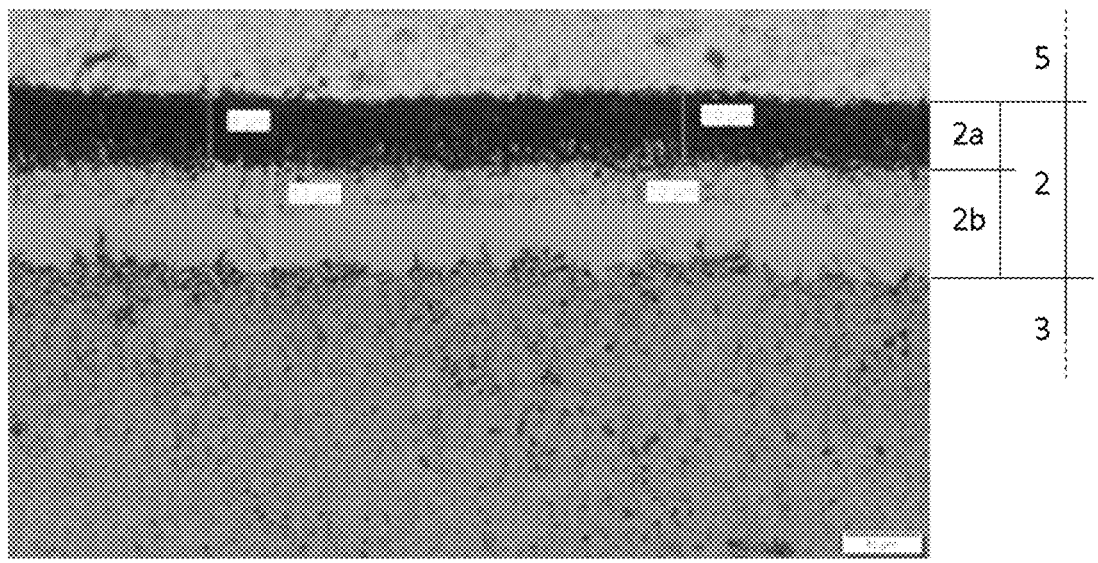
FIG. 8 is a micrograph of a part made of ferrous metal according to the invention (ARCOR FLASH processing).

FIG. 7 illustrates a part made of ferrous metal that has received single ARCOR nitrocarbonisation (without quenching), and FIG. 8 illustrates a part according to the invention, that therefore has received nitrocarbonisation then HF quenching (ARCOR+quenching by HF induction, according to the invention).

In FIG. 8, it can be seen that the combination layer 2 of the part P comprises an upper layer 2a that is black in colour and measures about ten micrometres. This upper layer 2a has been made porous by HF quenching, and is clearly revealed by the Nital. This demonstrates that, at the end of the treatment methos according to the invention, the combination layer is slightly degraded following HF quenching, but remains present, and retains its structural integrity at least on its lower part 2b.

Such an upper layer 2a cannot be observed in FIG. 7. The structure of the combination layer has in fact not been modified because no quenching has taken place.

The part P according to the invention therefore does indeed have a combination layer 2 providing the part with wear resistance, friction resistance and corrosion resistance properties, despite the fact that HF quenching has been performed without a protective film.

Figure 9:
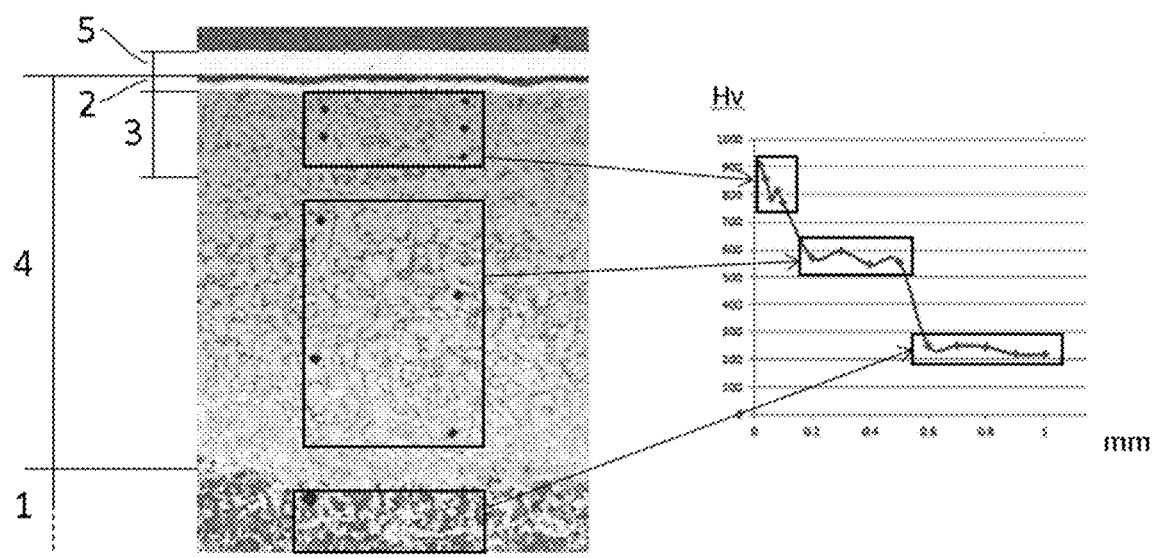
FIG. 9 is a montage featuring a micrograph of a part made of ferrous metal according to the invention, and also a hardness profile obtained by measuring this same part.

FIG. 9 is a montage juxtaposing a micrograph of a part P according to the invention, and a hardness profile obtained by measuring this same part. Hardness measurement points are visible on the micrograph, and measurement bearings corresponding to the different layers have been defined.

In this figure, the partially oxidised combination layer 2 and the induction layer 4 are particularly visible. The hardness measurements performed just below the combination layer show a hardness of up to 900 HV. Moving away from the surface of the part and moving down towards the core of the part, the hardness decreases in an almost linear way, which makes it possible to estimate the thickness of the diffusion region 3 to be approximately 175 µm, a depth in which the hardness is 775 HV.

For depths ranging from 200 µm to 500 µm, the hardness is generally stable at values of between 550 HV and 600 HV. These depths are located in the induction treatment zone, which can be visually detected on the micrograph by the crystallography of the part.

Measurements taken from a depth of 600 µm and beyond are located in the base material of the part, i.e., the core of the part, which has not received any treatment. Hardnesses of approximately 250 HV are measured.

Figure 10:
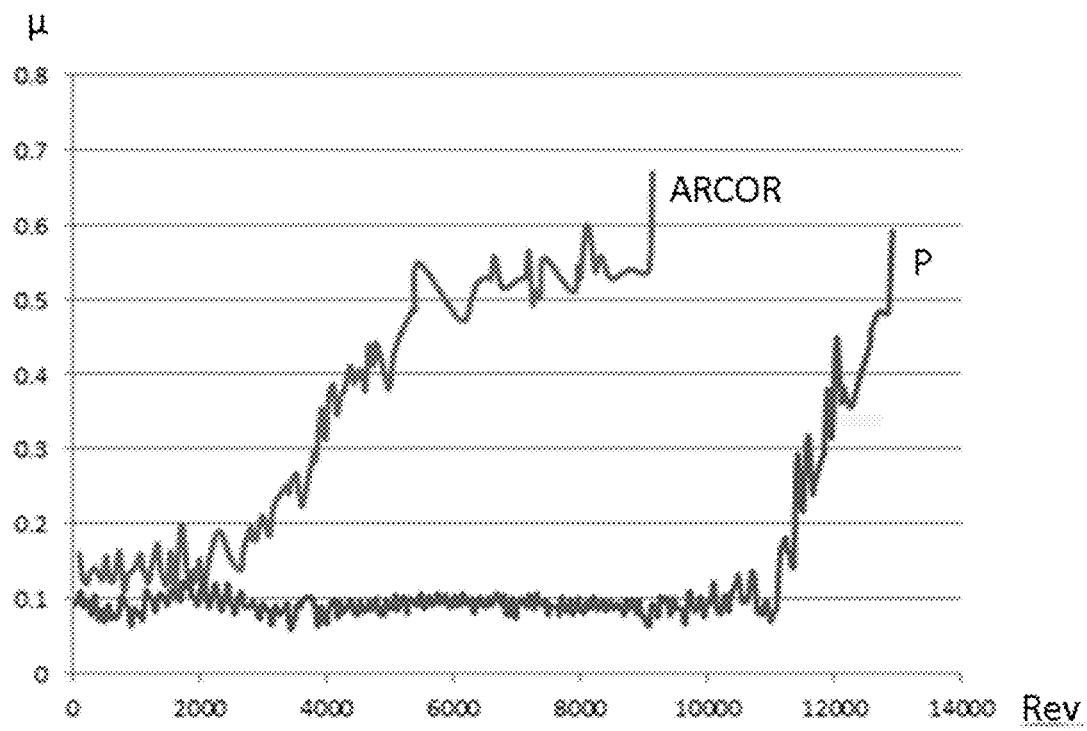
FIG. 10 is a graph illustrating the variation in the friction coefficient of rings, for a ring in accordance with the invention (ARCOR FLASH treatment) and a ring of the prior art (ARCOR treatment only).

In reference to FIGS. 10 to 12, the Applicant has then performed mechanical ageing tests on parts in order to characterise the performance of the parts obtained. A smooth 42CD4 steel ring with single ARCOR nitrocarbonisation, referred to below as the "ARCOR ring", is compared with a smooth 42CD4 steel ring with ARCOR nitrocarbonisation and HF quenching according to the invention.

These two rings have been mounted on 16NC6 CT steel shafts, with commercial lubricant added. The load applied induced a contact pressure of 50 MPa, and the rotational speed of the rings relative to the axis was 7.8 mm/s.

FIG. 10 is a graph illustrating the variation in the friction coefficient of these two rings as a function of the number of revolutions performed. The y-axis shows the friction coefficient µ (without a unit), and the x-axis shows the number of revolutions Rev (in revolutions) that the ring is subjected to. It can be seen that the single ARCOR ring has a new friction coefficient of approximately 0.15µ, and that this friction coefficient begins to increase steadily from only 2000 revolutions until high values are reached, of approximately 0.6µ for about 9000 revolutions.

The part P according to the invention has, in the new state, a friction coefficient slightly lower than that of the single ARCOR ring, of approximately 0.1µ, and remains stable up to approximately 11,000 revolutions. It is only from this value that the friction coefficient begins to increase, reaching a value of 0.6µ to approximately 125,000 revolutions, similar to that of the single ARCOR ring.

FIGS. 11 and 12 are photographs respectively of the single ARCOR ring and of part P according to the invention, after these tests. It can be seen that the single ARCOR ring shows marked wear, material having been wrenched due to seizing. Part P has less pronounced wear.

FIG. 13 is a close-up view of the micrograph in FIG. 4, centred on the induction layer 4. The segment [AB] represents the thickness of the induction layer 4. Processing the image of FIG. 13 makes it possible to estimate the proportion of the zones consisting of Fe(α) ferrite in the induction layer, i.e., relative to the sum of the Fe(α) ferrite zones and the Fe(α') martensite zones. More precisely, by defining lower and upper grey level thresholds, it is possible to estimate the air occupied by the average grey zone of the martensite phase, and thus to increase the ferrite level. It is advisable to use two thresholds and to vary them in order to reach this estimate, because although the ferrite appears clearly, the phase interfaces may appear dark and for ferrites of small dimensions this may not be negligible.

In the example of FIG. 13, the residual ferrite content relative to the rest of the layer delimited by the segment [AB] is between 1% and 15%, it being understood that this content tends towards 1% in the vicinity of the combination layer (point A), and tends towards 15% in the vicinity of the core (point B). The residual ferrite content is represented by volume.

In general, the treatment method according to the invention makes it possible to obtain a residual ferrite content in the part, between the diffusion region 3/combination layer 2 interface and a depth of 500 µm (segment [AB]), greater than or equal to 1%, preferably greater than or equal to 5%.

Similarly, the treatment method according to the invention makes it possible to obtain a residual ferrite content in the part, between the diffusion region 3/combination layer 2 interface and a depth of 500 µm (segment [AB]), less than or equal to 50%, preferably less than or equal to 30%, more preferably less than or equal to 20%, and more preferably less than or equal to 15%.

Preferably, the residual ferrite content should be between 1% and 20%, preferably between 5% and 15%.

The production process may optionally comprise an impregnation step in order to improve the corrosion resistance of part P.

Preferably, impregnation should take place after quenching by induction.

Impregnation itself is a technique that is well known to the person skilled in the art, and a particular method is described, for example, in the document EP3237648. The impregnation may be performed by dipping or by spraying.

The impregnation protects the part because it may delay the start of corrosion, reduce the corrosion rate and thus increase the service life of the part.

It is possible to evaluate the corrosion resistance of the parts by means of tests in a corrosive atmosphere, for example a saline spray. The EN ISO 9227 standard "Corrosion tests in artificial atmospheres—Tests in saline sprays" describes such tests. By adding an impregnation step to the method according to the invention, it is possible to obtain a part P with a corrosion resistance that is greater than 80 h, according to a test using a neutral saline spray.

In view of the above, and unexpectedly, many advantages can be obtained by performing a nitriding operation followed by a high-frequency induction quenching operation according to the invention. These operations make it possible to obtain parts made of ferrous materials having significant resistance to wear by abrasion and adhesion, and an improvement in friction properties, resistance to scaling combined with correct corrosion resistance, without needing to coat the part before HF quenching.

The invention claimed is:

1. A method for treating a part made of ferrous metal, comprising:
 a nitriding operation forming on the part a combination layer having a thickness of between 5 µm and 30 µm, and a diffusion region, arranged beneath and in contact with the combination layer, having a thickness of between 100 µm and 500 µm; then
 an operation of quenching the part by high-frequency induction, over an induction depth that is greater than or equal to 0.5 mm, thereby hardening the part and lending said part:
  a surface hardness greater than or equal to 50 HRC,
  a hardness of the combination layer greater than or equal to 400 HV0.05,
  a hardness of the part greater than or equal to 500 HV0.05 at a depth of 500 µm,
and wherein the high-frequency induction quenching operation is performed without the application of a protective film on the part prior to the induction quenching operation.

2. The method according to claim 1, wherein the induction quenching operation is not followed by a tempering operation.

3. The method according to claim 1, wherein the operation of quenching the part by high-frequency induction is performed in such a way that ferrite is conserved in the part between the diffusion region/combination layer interface and at a depth of 500 µm.

4. The method according to claim 1, wherein the operation of quenching the part by high-frequency induction is performed in such a way as to have a residual ferrite content in the part, between the diffusion region/combination layer interface and at a depth of 500 µm, of between 1% and 50% by volume.

5. The method according to claim 1, wherein the operation of quenching the part by high-frequency induction is performed in such a way as to have a residual ferrite content in the part, between the diffusion region/combination layer interface and a depth of 500 µm, of between 5% and 20% by volume.

6. The method according to claim 1, further comprising an impregnation step subsequent to the high-frequency induction quenching operation.

7. The method according to claim 6, wherein the method provides the part with a corrosion resistance that is greater than 80 h, according to a neutral saline spray test.

8. The method according to claim 1, wherein the high-frequency induction quenching operation is performed with the following parameters:
 a frequency of 50 to 400 KHz,
 a linear energy of 4.6 to 5.8 J/mm.

9. A nitriding part made of ferrous metal, comprising a combination layer having a thickness of between 5 µm and 30 µm, and a diffusion region, arranged beneath and in contact with the combination layer, having a thickness of between 100 µm and 500 µm, said part having:
 a surface hardness greater than or equal to 50 HRC,
 a hardness of the combination layer greater than or equal to 400 HV0.05, a hardness of the part greater than or equal to 500 HV0.05 at a depth of 500 µm, said part comprising ferrite and martensite between the diffusion region/combination layer interface and a depth of 500 µm.

10. The part according to claim 9, wherein the hardness of the part at a depth of 0.5 mm is greater than or equal to a core hardness of +100 HV0.05.

11. The part according to claim 9, wherein the hardness of the part at a depth of 0.25 mm is greater than or equal to a core hardness of +350 HV0.05.

12. The part according to claim 9, wherein the part is made of very low-alloy steel, of the C10-C70 family, having a manganese content less than 1%.

13. The part according to claim 9, wherein the part comprises ferrite and martensite between the diffusion region/combination layer interface and a depth of 300 µm.

14. The part according to claim 9, wherein the part comprises a ferrite content, between the diffusion region/combination layer interface and a depth of 500 µm, of between 1% and 50% by volume.

15. The part according to claim 9, wherein the part comprises a ferrite content, between the diffusion region/combination layer interface and at a depth of 500 µm, of between 5% and 20% by volume.

16. The part according to claim 9, wherein the part has a corrosion resistance that is greater than 80 h, according to a test using a neutral saline spray.

* * * * *